Patented Sept. 8, 1931

1,822,045

UNITED STATES PATENT OFFICE

MAX ALBERT KUNZ, OF MANNHEIM, KARL KOEBERLE, OF LUDWIGSHAFEN-ON-THE-RHINE, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

PRODUCTION OF MONONITROANTHANTHRONES

No Drawing. Application filed February 18, 1929, Serial No. 341,056, and in Germany February 24, 1928.

The present invention relates to the production of mononitroanthanthrone.

We have found that mononitroanthanthrone is obtained by treating anthanthrone in an organic solvent of high boiling point which expression comprises solvents boiling above 100° C., such as nitrobenzene, its homologues or analogues, for instance nitronaphthalene, chlorinated benzenes, for example di- or trichlorobenzene, and the like, with strong nitric acid of a concentration of at least 66 per cent in a proportion of at least 2 parts by weight of the said solvent per each part by weight of nitric acid. Preferably a larger amount of solvent is employed, for instance, 10 parts of solvent for each part of nitric acid. The mononitroanthanthrone formed separates out directly as orange needles, dissolving to a violet solution in concentrated sulfuric acid, giving blue grey dyeings on cotton from a red vat.

Mononitro compounds of derivatives of anthanthrone, such as for example hydroxy-, alkoxy-, or halogen derivatives, can be obtained in the same manner.

The following examples will further illustrate the nature of the said invention which however is not restricted thereto. The parts are by weight.

Example 1

30.6 parts of anthanthrone are stirred and heated to boiling in 300 parts of nitrobenzene and 20 parts of a 96 per cent nitric acid solution. As soon as the nitration is complete, the mixture is left to cool, and the precipitated orange needles of mononitroanthanthrone are filtered off by suction. The reaction product, which is obtained in a high yield and purity, dissolves to a violet solution in concentrated sulfuric acid, can be recrystallized from solvents of high boiling point, in which it is very sparingly soluble, and furnishes with an alkali metal hydrosulfite solution a red vat dyeing cotton in blue grey shades.

Example 2

30.6 parts of anthanthrone are stirred with 300 parts of nitrobenzene and 35 parts of a 96 per cent nitric acid, while warming to between about 80° and 100° C. The reaction mixture is worked as described in Example 1, and mononitroanthanthrone is obtained.

Example 3

46 parts of dibromanthanthrone are suspended in 230 parts of nitrobenzene and boiled, while stirring, after the addition of 100 parts of 96 per cent nitric acid until the reaction is completed which may be recognibed from a sample dissolving in concentrated sulfuric acid to a violet solution. After cooling the reaction product is filtered by suction. The mononitrodibromanthanthrone thus obtained forms orange yellow needles dissolving to a violet solution in concentrated sulfuric acid and dyes cotton from a violet vat grey shades.

In a similar manner the mononitro derivatives of monoiodo-, monochloro-, monobromo- and dichloroanthanthrone are obtained.

Example 4

3.3 parts of monomethoxyanthanthrone obtainable by methylating the monohydroxyanthanthrone prepared by heating the diazosulfate solution of monoaminoanthanthrone, are heated for a short time in 30 parts of nitrobenzene with 3 parts of 96 per cent nitric acid to between 100 and 120° C. The reaction product is filtered after cooling. The mononitro-monohydroxy anthanthrone (the methoxy group being saponified under the conditions of working) is a red orange powder dissolving to a violet solution in concentrated sulfuric acid and to a green blue solution in a caustic alkali solution, dyes cotton from a red brown vat with a violet tinge grey shades.

What we claim is:—

1. A process for the production of mononitro compounds of anthanthrones which comprises acting on an anthanthrone with strong nitric acid in an organic solvent of high boiling point in a proportion of at least 2 parts by weight of solvent per each part by weight of nitric acid.

2. A process for the production of mononitroanthanthrone which comprises acting on anthanthrone with strong nitric acid in an organic solvent of high boiling point in a proportion of at least 2 parts by weight of solvent per each part by weight of nitric acid.

3. A process for the production of mononitroanthanthrone which comprises acting on anthanthrone with nitric acid of 96 per cent strength in nitrobenzene in a proportion of about 10 parts by weight of nitrobenzene per each part by weight of nitric acid.

4. As new articles of manufacture mononitro compounds of anthanthrones forming orange needles, dissolving to violet solutions in concentrated sulfuric acid and dyeing cotton from red vats grey shades.

5. As a new article of manufacture mononitroanthanthrone which is sparingly soluble in organic solvents of high boiling point, crystallizing therefrom in orange needles, dissolving in concentrated sulfuric acid to a violet solution and dyeing cotton from a red vat blue grey shades.

In testimony whereof we have hereunto set our hands.

MAX ALBERT KUNZ.
KARL KOEBERLE.
WERNER ZERWECK.